United States Patent Office 2,949,473
Patented Aug. 16, 1960

2,949,473

DIHYDROPYRAN COMPOUNDS

Joachim Dazzi, Dayton, Ohio, assignor to Monsanto Chemical Company, St. Louis, Mo., a corporation of Delaware No Drawing. Filed Apr. 18, 1956, Ser. No. 578,888

2 Claims. (Cl. 260—345.8)

This invention relates to pyran compounds and more particularly provides new and valuable carboxy-containing dihydropyrans, a process of producing the same and vinyl chloride polymers plasticized with said new compounds.

An object of the invention is the provision of new and useful dihydropyran carboxylates. Another object of the invention is the preparation of useful addition products of dihydropyran and certain aliphatic α,β-unsaturated, olefinic dicarboxylic acid esters. A further object of the invention is to provide for the synthetic resins and plastics, rubber and textile industries, a new class of stable, viscous compounds of high carboxylate content.

These and other objects hereinafter disclosed are provided by the following invention wherein there are prepared mixtures of carboxylates by the addition reaction of certain esters of fumaric acid and a dihydropyran. The reaction is one of simple addition in which one mole of a dihydropyran adds to from one to two moles of the fumarate substantially according to the scheme:

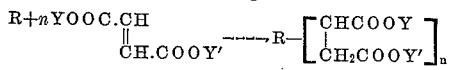

in which R is the dihydropyran nucleus, Y and Y' are selected from the class consisting of alkyl and alkoxyalkyl radicals of from 1 to 8 carbon atoms and $n$ is an integer of 1 to 2.

Dihydropyrans useful for the present purpose include 3,4-dihydro-2H-pyran and 5,6-dihydro-2H-pyran. Adducts having the above general formula are alkyl or alkoxyalkyl esters of (1,2-dicarboxyethyl)dihydropyran. Although it is believed that the 1,2-dicarboxyethyl radical is attached, in the case of the 1:1 adduct, at the carbon atom which is adjacent to the olefinic carbon atom of the dihydropyran, the exact position at which the dicarboxyethyl radical is present is not exactly known. In the addition product the olefinic double bond of the originally employed dihydropyran is intact. Depending upon reaction conditions and the quantity of fumarate present in the reaction mixture from one to two (1,2-dicarboxyethyl) radicals are attached at the saturated carbon atoms of the dihydropyran nucleus. Such radicals may be present at the same or different saturated carbon atoms. The reaction product is generally a mixture of adducts having varying fumarate content. The components of the mixture may be separated from each other, e.g., by fractional distillation; however, for many purposes the crude mixture of adducts is advantageously employed directly and isolating procedures need not be employed prior to utilization of the presently obtained reaction products.

Alkyl or alkoxyalkyl esters of fumaric acid which may be employed in preparing the present adducts are the simple or mixed alkyl fumarates such as methyl, ethyl, n-propyl, isopropyl, butyl, isoamyl, n-hexyl, n-octyl, 2-ethylhexyl fumarate, ethyl methyl fumarate, ethyl n-propyl fumarate, isopropyl n-octyl fumarate, etc. The simple alkoxyalkyl fumarates or mixed fumarates in which the alcohol portions of the ester are derived from two different alkoxyalkanols or from one mole of an alkoxyalkanol and one mole of an alkanol are likewise useful. Examples of such alkoxylalkyl fumarates are bis(2-ethoxyethyl) fumarate, bis(3-butoxypropyl) fumarate, bis(4-methoxybutyl) fumarate, ethyl 2-ethoxyethyl fumarate, butyl 3-propoxypropyl fumarate, etc.

Reaction of the dihydropyran with the fumaric acid esters to form addition products takes place readily by heating the dihydropyran with the fumarate in the presence or absence of an inert diluent or solvent. Temperatures of from, say 200–300° C. and preferably of from 210–280° C. are used. The number of (1,2-dicarboxyethyl) radicals present in the addition product depends upon the nature of the fumarate and upon the reaction conditions employed. Generally, operation within the high temperature ranges, i.e., temperatures of above, say, 230° C. and below the decomposition point of any of the reactants, leads to the production of addition products containing a greater number of (1,2-dicarboxyethyl) radicals than are present in addition products obtained from the same reactants at lower temperatures. The number of ester groups present in the addition product also depends upon the nature of the individual fumarate employed. Usually the lower alkyl fumarates are more reactive than either the higher alkyl fumarates or the higher alkoxyalkyl fumarates. In view of the effect of the reaction conditions and nature of the fumarate upon the extent to which the fumarate participates in the reaction, it is recommended that for each initial run there be experimentally determined the operating conditions to be observed for obtaining a (1,2-dicarboxyethylated) dihydropyran containing the desired number of ester radicals.

The number of ester radicals present in the addition product will also depend upon the availability of fumarate in the reaction mixture. Obviously, for the formation of adducts in which one mole of the dihydropyran has added to, say, two moles of the fumarate it is necessary to provide in the initial reaction mixture a quantity of fumarate which is about two times as great as that of the dihydropyran. Even though introduction of the second mole of the (1,2-dicarboxyethyl) radical into the dihydropyran nucleus appears to proceed much more slowly than does the introduction of the first mole, generally even when substantially equimolar proportions of dihydropyran and fumarate are present in the reaction mixture the product contains not only the 1:1 adduct but also varying proportions of 1:2 adduct.

In favoring production of 1:1 adduct it is thus preferable to use a slight excess of the dihydropyran; and in favoring production of the higher adducts the presence of a substantial excess of the fumarate is advantageous.

Since the alkyl or alkoxyalkyl fumarates employed in the present reaction are generally miscible with dihydropyran under the reaction conditions used, no extraneous solvent or diluent need generally be employed. For successful reaction a diluent may or may not be present. Reaction is advantageously effected in an inert atmosphere, e.g., in nitrogen or in carbon dioxide; and for good yields of product within comparatively short reaction times operation in a closed vessel, i.e., at pressures above atmospheric, is recommended.

In practice, the dihydropyran and the fumarate are mixed in a reaction vessel in proportions required for an adduct of a desired ester content and the mixture is heated, say, at the refluxing temperature thereof, for a time of, say, a few hours to a day. Completion of the reaction may be noted by cessation in change of refractive index upon continued heating. The product is generally a viscous liquid which comprises a mixture of addition products of different (1,2-dicarboxyethyl) content and unreacted dihydropyran and/or fumarate. Any unreacted material may be readily recovered, e.g., by distillation.

The present esters of (1,2-dicarboxyethyl)dihydropyran are stable, high boiling, viscous liquids. They are valuable for a variety of commercial and technical uses, e.g., as lubricant adjuvants, as intermediates for the preparation of resins of the polyamide type, as moistureproofing agents, etc.

The present dihydropyran-fumarate adducts are particularly valuable as plasticizers for polyvinyl chloride and copolymers of at least 70% by weight of vinyl chloride and up to 30% by weight of an unsaturated monomer copolymerizable therewith, for example, vinyl acetate, vinylidene chloride, etc. The present dihydropyran esters impart great flexibility to vinyl chloride polymers at low temperatures; they are compatible with such polymers and show no exudation of plasticizers even at plasticizer content of up to 50%. Although the quantity of plasticizer will depend upon the particular polymer to be plasticized and upon its molecular weight, it is generally found that compositions having from 5% to 50% by weight of the present adducts will, in most cases, be satisfactory for general utility. The good flexibility of the plasticized compositions increases with increasing plasticizer concentration.

The present invention is further illustrated but not limited by the following examples:

*Example 1*

A mixture consisting of 126 g. (1.5 moles) of 3,4-dihydro-2H-pyran, 684 g. (3 moles) of butyl fumarate and 1.5 g. of di-tert-butylcatechol (as polymerization inhibitor) was heated in an autoclave in a nitrogen atmosphere for 8 hours at a temperature of 220° C. Distillation of the resulting reaction mixture to remove material boiling below 180° C./2 mm. gave as residue 134 g. of the substantially pure dibutyl (1,2-dicarboxyethyl)dihydropyran, $n_D^{25}$ 1.4800, having a saponification equivalent of 152.8 as against 156, the calculated value, and analyzing as follows:

|  | Found | Calcd. for $C_{17}H_{28}O_5$ |
| --- | --- | --- |
| Percent C | 65.51 | 65.3 |
| Percent H | 9.07 | 8.97 |

*Example 2*

Sixty parts of polyvinyl chloride and 40 parts by weight of the dibutyl (1,2-dicarboxyethyl)dihydropyran of Example 1 were mixed on a milling roll to a homogeneous blend. During the milling there was observed substantially no fuming and discoloration. A molded sheet of the mixture was clear and transparent and substantially colorless. Testing of the molded sheet for low temperature flexibility by the Clash-Berg method gave a value of 6.1° C. Tests on the volatility characteristics of the plasticized composition by a modified carbon absorption method of the Society of Plastics Industry gave a value of 2.3%. The plasticized material had a hardness of 94 before the volatility tests and a hardness of 97 after the volatility tests. When subjected to heat at a temperature of 325° F. for a period of 30 minutes the clarity and color of the molded product was substantially unchanged. Tests of the water resistance properties of the plasticized material by immersing the molded specimen for 24 hours in water gave a water absorption value of 0.52% and a solids loss value of only 0.03%.

Adducts of other alkyl fumarates or of alkoxyalkyl fumarates and dihydropyran likewise possess very good plasticizing properties for vinyl chloride polymers. Thus, by employing 40 parts by weight of the adduct of ethyl fumarate or of 2-butoxyethyl fumarate and 3,4-dihydro or 5,6-dihydro-2H-pyran with 60 parts by weight of polyvinyl chloride or with 60 parts by weight of a vinyl chloride-vinyl acetate copolymer known to the trade as "Vinylite" there are obtained clear, colorless compositions of very good flexibility and stability.

While the above examples show only compositions in which the ratio of plasticizer to polymer content is 40:60, this ratio being employed in order to get comparable efficiencies, the content of ester to polyvinyl chloride may be widely varied, depending upon the properties desired in the final product. For many purposes a plasticizer content of, say, from only 10 percent to 20 percent is preferred. The present adducts are compatible with polyvinyl chloride over wide ranges of concentrations, up to 50 percent of ester based on the total weight of the plasticized composition yielding desirable products.

Although the invention has been described particularly with reference to the use of the present adducts as plasticizers for polyvinyl chloride, these adducts are advantageously employed also as plasticizers for copolymers of vinyl chloride, for example, the copolymers of vinyl chloride with vinyl acetate, vinylidene chloride, etc. Preferably, such copolymers have a high vinyl chloride content, i.e., a vinyl chloride content of at least 70 percent by weight of vinyl chloride and up to 30 percent by weight of the copolymerizable monomer.

The plasticized polyvinyl halide compositions of the present invention have good thermal stability; however, for many purposes it may be advantageous to use known stabilizers in the plasticized compositions. Inasmuch as the present adducts are substantially unreactive with the commercially available heat and light stabilizers which are commonly employed with polyvinyl chloride or copolymers thereof, the presence of such materials in the plasticized products does not impair the valuable properties of the adducts. The present adducts are of general utility in softening vinyl chloride polymers. They may be used as the only plasticizer components in a compounded vinyl chloride polymer or they may be used in conjunction with other plasticizers.

What I claim is:

1. The alkyl ester of (1,2-dicarboxyethyl)dihydropyran wherein the alkyl radical has from 1 to 8 carbon atoms.

2. Dibutyl (1,2-dicarboxyethyl)dihydropyran.

References Cited in the file of this patent

UNITED STATES PATENTS

| 2,498,605 | Ham | Feb. 21, 1950 |
| 2,504,930 | Hatzel | Apr. 18, 1950 |
| 2,522,966 | Schudel et al. | Sept. 19, 1950 |
| 2,537,921 | Smith | Jan. 9, 1951 |
| 2,574,444 | Whetstone | Nov. 6, 1951 |
| 2,576,323 | Whetstone | Nov. 27, 1951 |